United States Patent
Arai et al.

(10) Patent No.: US 7,214,745 B2
(45) Date of Patent: May 8, 2007

(54) PROCESS FOR PRODUCING POLYMER

(75) Inventors: Toru Arai, Tokyo (JP); Shingo Hanazato, Tokyo (JP); Masataka Nakajima, Tokyo (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 209 days.

(21) Appl. No.: 10/486,242

(22) PCT Filed: Aug. 6, 2002

(86) PCT No.: PCT/JP02/08023

§ 371 (c)(1),
(2), (4) Date: Feb. 9, 2004

(87) PCT Pub. No.: WO03/014166

PCT Pub. Date: Feb. 20, 2003

(65) Prior Publication Data

US 2005/0176901 A1  Aug. 11, 2005

(30) Foreign Application Priority Data

Aug. 7, 2001  (JP) ............................. 2001-238803
Mar. 20, 2002 (JP) ............................. 2002-078048

(51) Int. Cl.
  C08F 4/52  (2006.01)
  C08F 4/76  (2006.01)

(52) U.S. Cl. ............... 526/153; 526/160; 526/170; 526/126; 526/134; 526/943

(58) Field of Classification Search ............... 526/160, 526/170, 943, 134, 129, 153, 126
See application file for complete search history.

(56) References Cited

U.S. PATENT DOCUMENTS

| | | | |
|---|---|---|---|
| 5,679,812 A | 10/1997 | Winter et al. | |
| 5,698,487 A * | 12/1997 | Sacchetti et al. | 502/117 |
| 5,869,723 A * | 2/1999 | Hinokuma et al. | 556/402 |
| 5,883,213 A | 3/1999 | Arai et al. | 526/347 |
| 5,910,464 A * | 6/1999 | Resconi et al. | 502/111 |
| 5,932,669 A * | 8/1999 | Rohrmann et al. | 526/160 |
| 5,962,718 A | 10/1999 | Reetz et al. | 556/51 |
| 5,985,784 A * | 11/1999 | Winter et al. | 502/113 |
| 6,066,709 A | 5/2000 | Arai et al. | 526/126 |
| 6,121,182 A * | 9/2000 | Okumura et al. | 502/152 |
| 6,136,932 A | 10/2000 | Dall 'Occo et al. | 526/160 |
| 6,235,855 B1 | 5/2001 | Arai et al. | 526/170 |
| 6,248,850 B1 | 6/2001 | Arai | 526/347 |
| 6,329,479 B1 | 12/2001 | Arai et al. | 526/347 |
| 6,348,556 B1 | 2/2002 | Arai et al. | 526/347 |
| 6,376,406 B1 * | 4/2002 | Ashe et al. | 502/103 |
| 6,410,649 B1 | 6/2002 | Oda et al. | 526/347 |
| 6,410,665 B1 * | 6/2002 | Fritze et al. | 526/160 |
| 6,410,673 B1 | 6/2002 | Arai et al. | 526/347 |
| 6,417,308 B2 | 7/2002 | Arai et al. | 526/347 |
| 6,472,490 B1 | 10/2002 | Arai et al. | 526/160 |
| 6,489,424 B2 | 12/2002 | Arai et al. | 526/347 |
| 6,559,234 B1 | 5/2003 | Arai et al. | 525/245 |
| 6,566,453 B1 | 5/2003 | Arai et al. | 525/244 |
| 6,630,215 B1 | 10/2003 | Oda et al. | 428/35.7 |
| 6,891,004 B2 * | 5/2005 | Arai et al. | 526/134 |

FOREIGN PATENT DOCUMENTS

| | | |
|---|---|---|
| EP | 381184 | 8/1990 |
| EP | 676421 | 10/1995 |
| EP | 1 041 092 A1 | 10/2000 |
| EP | 1 043 339 A1 * | 10/2000 |
| EP | 1 195 386 A1 | 4/2002 |
| JP | 1-275609 | 11/1989 |
| JP | 2-22307 | 1/1990 |
| JP | 7-62012 | 3/1995 |
| JP | 9-176219 | 7/1997 |
| JP | 09-176219 A * | 7/1997 |
| WO | WO 97/40075 A1 * | 10/1997 |

OTHER PUBLICATIONS

JP 09-176219 (abstract and translation in English).*

* cited by examiner

*Primary Examiner*—David W. Wu
*Assistant Examiner*—Rip A. Lee
(74) *Attorney, Agent, or Firm*—Oblon, Spivak, McClelland, Maier & Neustadt, P.C.

(57) ABSTRACT

A process for producing an olefin polymer with high polymerization activity without using an expensive co-catalyst or using a limited amount of the co-catalyst, more particularly a process for producing a high molecular weight (co)polymer with high polymerization activity even at a high polymerization temperature which is more practical.

At least one olefin is polymerized by means of a polymerization catalyst comprising at least one transition metal compound selected from transition metal compounds which have a substituted indenyl group, represented by a certain specific chemical formula, and an organoaluminum compound represented by the formula $Al(R)_3$.

15 Claims, No Drawings

PROCESS FOR PRODUCING POLYMER

TECHNICAL FIELD

The present invention relates to a process for producing an olefin polymer by means of a transition metal compound.

BACKGROUND ART

Metallocene Catalyst and Process for Producing Olefin Polymer

Since Kaminski, Sinn, et al. discovered that a polymerization catalyst comprising a metallocene compound having a ligand having two cyclopentadienyl ring structures and a methylalumoxane synthesized from trimethylaluminum and water, is capable of polymerizing ethylene with high activity (Angew, Chem., Int. Ed. Engl., 19, 390 (1980)), olefin polymerization by means of a so-called single-site polymerization catalyst has been actively researched and practically used.

Particularly, olefin polymerization catalysts constituted by transition metal compounds activated by a cocatalyst comprising a methylalumoxane or a boron compound, have been widely used as catalysts for producing polyolefins. Among them, polymerization catalysts containing a metallocene compound having a structure in which two ligands are crosslinked by carbon or silicon, are known particularly as catalysts for producing LLDPE, or isotactic or syndiotactic polypropylenes.

However, they have a problem that the methylalumoxane or the boron compound to be used as a cocatalyst, is expensive.

JP-A-3-197513 discloses a polymerization catalyst constituted by an alkyl aluminum and a certain specific transition metal compound (a metallocene compound) without using the methyl alumoxane or the boron compound as a cocatalyst. However, with the transition metal compound employed, the activity is low, and the molecular weight of the obtainable polymer is low, whereby it is still poor in practical applicability. Even if it is attempted to improve the activity at a higher polymerization temperature, it is considered that at a polymerization temperature condition higher than the polymerization temperature of 50° C. specifically disclosed, the molecular weight tends to decrease, such being poor in practical applicability.

Further, JP-A-7-62012 discloses a method for polymerization under such a condition that the aluminum/transition metal ratio of a transition metal compound and an alkyl aluminum compound is from 1 to 500 by molar ratio calculated as atoms. However, by such a ratio and with such a transition metal compound employed, it is considered that the activity is low, and such is poor in practical applicability. Further, with the transition metal compound employed, even if it is attempted to improve the activity at a higher polymerization temperature, it is considered that at a polymerization temperature condition higher than the polymerization temperature specifically disclosed, the molecular weight tends to be low, such being poor in practical applicability.

It is an object of the present invention to provide a process for producing an olefin polymer with higher polymerization activity without using an expensive co-catalyst or using such a cocatalyst within a limited range, more particularly a process for producing a high molecular weight (co)polymer with high polymerization activity even at a high polymerization temperature which is more practical.

DISCLOSURE OF THE INVENTION

The present inventors have conducted a study to solve the above-mentioned problems and have surprisingly found that a catalyst constituted by a certain specific transition metal compound and a certain specific organoaluminum compound, exhibits an extremely high activity for olefin (co) polymerization within a wide polymerization temperature range, and the molecular weight of a copolymer thereby obtainable, is also very high, and thus have accomplished an invention.

Namely, the first mode of the present invention is a process for producing an olefin polymer, characterized by polymerizing at least one olefin by means of a polymerization catalyst comprising at least one transition metal compound selected from transition metal compounds represented by the following formula (1) and an organoaluminum compound represented by the following formula (2).

The transition metal compound which may be used in the first mode of the present invention is at least one transition metal compound selected from the group represented by the following formula (1). When such a specific transition metal compound is employed, an olefin (co)polymer having a high molecular weight can be produced with a very high activity even at an optional polymerization temperature. Further, even at a polymerization temperature of at least 70° C., preferably at least 80° C., most preferably at least 90° C., which is industrially advantageous, i.e. where heat removal from the polymerizer is efficient, an olefin (co)polymer having a practically sufficiently high molecular weight can be produced with a remarkably high activity.

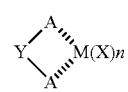

Formula (1)

wherein each A is a substituted indenyl group, or one of A is a substituted indenyl group and the other is a group selected from groups which have a nitrogen atom or an oxygen atom coordinated or directly bonded to metal M and, if necessary, a $C_{1-20}$ hydrocarbon group (said groups may further contain from 1 to 3 boron, silicon, phosphorus, selenium, sulfur, chlorine or fluorine atoms), and in a case where each A is a substituted indenyl group, the two A may be the same or different;

Preferably, each A in the formula is a substituted indenyl group represented by the formula (3-1) or (3-2), or one of A is a substituted indenyl group represented by the formula (3-1) or (3-2) and the other is a group selected from nitrogen-containing or oxygen-containing groups which have a nitrogen atom or an oxygen atom coordinated or directly bonded to metal M (said groups may further have a substituent having a $C_{1-20}$ hydrocarbon group).

In the present invention, it is most preferred that each of the two A which are independent of each other, is a substituted indenyl group represented by the formula (3-1) or (3-2). The two A may be the same or different.

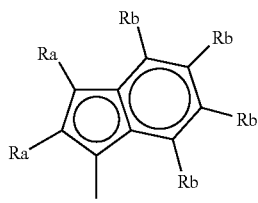

Formula (3-1)

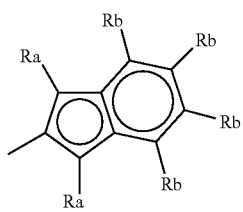

Formula (3-2)

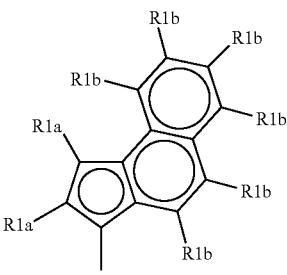

Formula (4-1)

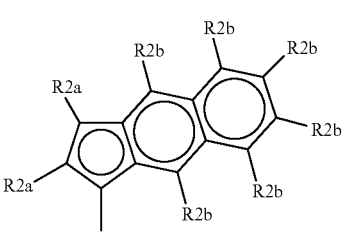

Formula (4-2)

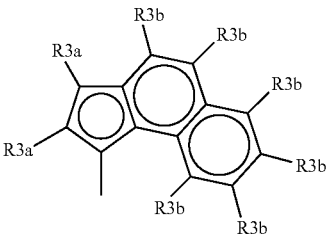

Formula (4-3)

Ra each independently is a substituent of hydrogen, halogen, a hydroxyl group, an amine group or a $C_{1-20}$ hydrocarbon group; the hydrocarbon group may contain from 1 to 3 halogen, silicon, phosphorus, oxygen, boron, nitrogen, sulfur or selenium atoms; and they may have a structure of an $OSiR_3$ group, a $SiR_3$ group, an $NR_2$ group, an OH group, an SR group, a SeR group, an OR group or a $PR_2$ group (each R is a $C_{1-10}$ hydrocarbon group).

Rb each independently is a substituent of hydrogen, halogen, a hydroxyl group, an amine group or a $C_{1-20}$ hydrocarbon group; the hydrocarbon group may contain from 1 to 3 halogen, silicon, phosphorus, oxygen, boron, nitrogen, sulfur or selenium groups; they may have a structure of an $OSiR_3$ group, a $SiR_3$ group, an $NR_2$ group, an OH group, an SR group, a SeR group, an OR group or a $PR_2$ group (each R is a $C_{1-10}$ hydrocarbon group); and further, adjacent substituents of such hydrocarbons may be united to form a single or plural 5- to 8-membered cyclic aromatic rings or aliphatic rings;

provided that at least one of Ra is not hydrogen, or at least one of Rb is not hydrogen.

Specific examples of such A include a 2-methyl-1-indenyl group, a 4-phenyl-1-indenyl group, a 4-naphthyl-1-indenyl group, a 2-methyl-4-phenyl-1-indenyl group, a 2-methyl-4-naphthyl-1-indenyl group, a 2-isopropyl-1-indenyl group, a 2-isopropyl-4-phenyl-1-indenyl group, a 2-isopropyl-4-naphthyl-1-indenyl group, a 2,3-dimethyl-1-indenyl group, a 2,3-dimethyl-4-phenyl-1-indenyl group, a 2,3-dimethyl-4-naphthyl-1-indenyl group, and the following benzoindenyl groups which may have various substituents.

Further, more preferred is a transition metal compound of the formula (1) wherein at least one of A is any one of benzoindenyl groups which may have substituents, represented by the following formulae (4-1) to (4-3). Most preferred is a transition metal compound wherein the two A are both benzoindenyl groups represented by the formulae (4-1) to (4-3). In a case where the two A are both benzoindenyl groups, they may be the same or different.

In the above formulae, R1a, R1b, R2a, R2b, R3a and R3b each independently is a substituent of hydrogen, halogen, a hydroxyl group, an amine group or a $C_{1-20}$ hydrocarbon group; these hydrocarbon groups may contain from 1 to 3 halogen, silicon, phosphorus, oxygen, boron, nitrogen, sulfur or selenium atoms; they may have a structure of a $OSiR_3$ group, a $SiR_3$ group, an $NR_2$ group, an OH group, an OR group, an SR group, a SeR group or a $PR_2$ group (each R is a $C_{1-10}$ hydrocarbon group); these R1a each other, R1b one another, R2a each other, R2b one another, R3a each other and R3b one another, may be the same or different; and further, adjacent such substituents may be united to form a single or plural 5- to 8-membered cyclic aromatic rings or aliphatic rings.

Among such benzoindenyl groups, a non-substituted benzoindenyl group may, for example, be 4,5-benzo-1-indenyl (another name: benzo(e)indenyl), 5,6-benzo-1-indenyl or 6,7-benzo-1-indenyl, and a substituted benzoindenyl group may, for example, be 2-methyl-4,5-benzoindenyl, α-acenaphtho-1-indenyl, 3-cyclopenta[c]phenanthryl, 1-cyclopenta[1]phenanthryl, 1-(2-methyl-cyclopenta[1]phenanthryl), or 3-(2-methyl-cyclopenta[c]phenanthryl).

Particularly preferably, a non-substituted benzoindenyl group may, for example, be 4,5-benzo-1-indenyl (another name: benzo(e)indenyl), and a substituted benzoindenyl group may, for example, be 2-methyl-4,5-benzoindenyl, 2-methyl-α-acenaphtho-1-indenyl, 1-(2-methyl-cyclopenta[1]phenanthryl), 3-(2-methyl-cyclopenta[c]phenanthryl), 3-cyclopenta[c]phenanthryl or 1-cyclopenta[1]phenanthryl.

Y in the formula is a substituted methylene group, a substituted 1,2-ethanediyl group, a substituted 1,3-propanediyl group, a substituted silicon group, a substituted boron group, a substituted germylene group or a substituted aluminum group, which has bonds to the two A and further has hydrogen or a $C_{1-20}$ hydrocarbon group as a substituent, and the substituent in Y may contain from 1 to 5 nitrogen, boron, silicon, phosphorus, selenium, oxygen, sulfur, chlorine or fluorine atoms, or may have a cyclic structure.

Examples of such Y include, for example, a dimethylsilanediyl group (a dimethylsilylene group), a diphenylsilanediyl group, a diisopropylamidoboranediyl group (a diisopropylamidoborane group), a phenylboranediyl group (a phenyl boron group), a dimethylmethylene group (an isopropylidene group), and a 1,2-ethanediyl group.

In the present invention, preferred is a transition metal compound of the formula (1) wherein Y is a substituted silicon group or a substituted boron group, which has bonds to the two A and further has hydrogen or a $C_{1-20}$ hydrocarbon group as a substituent. Further, most preferred is a transition metal compound wherein Y is the above-mentioned substituted boron group. Especially when the transition metal compound wherein Y is the above-mentioned substituted boron group, is employed, it is possible to obtain a remarkably high olefin polymerization activity and productivity.

In these cases, the substituent in Y may contain from 1 to 5 nitrogen, boron, silicon, phosphorus, selenium, oxygen, sulfur, chlorine or fluorine atoms, or may have a cyclic structure. As such an example, a dialkyl-substituted silicon group such as a dimethylsilylene group (a dimethylsilanediyl group), a diaryl-substituted silicon group such as a diphenylenesilylene group, or a substituted boron group such as a diisopropylamidoborane group, a phenylborane group, a 2,4,6-trimethylphenylborane group or a 2,4,6-trifluorophenylborane group, may be mentioned.

X each independently is hydrogen, halogen, a $C_{1-15}$ alkyl group, a $C_{3-20}$ alkenyl group, a $C_{6-10}$ aryl group, a $C_{8-12}$ alkylaryl group, a silyl group having a $C_{1-4}$ hydrocarbon substituent, a $C_{1-10}$ alkoxy group, or an amido or amino group having hydrogen or a $C_{1-22}$ hydrocarbon substituent; n is 0, 1 or 2; and when a plurality of X are present, they may be bonded to one another.

Examples of such X include, for example, chlorine, hydrogen, a methyl group, a benzyl group, a methoxy group, a dimethylamide group, and an N-methylanilide group.

M is zirconium, hafnium or titanium.

Among such transition metal compounds, to be preferably used in the present invention, preferred examples wherein Y is the above substituted boron group, will be shown below.

Diisopropylamidoboranediylbis(2-methyl-4,5-benzo-1-indenyl)zirconium dichloride, diisopropylamidoboranediylbis(4,5-benzo-1-indenyl)zirconium dichloride, diisopropylamidoboranediylbis{1-(2-methylcyclopenta[1]phenanthryl)}zirconium dichloride, diisopropylamidoboranediylbis(1-cyclopenta[1]phenanthryl)zirconium dichloride, diisopropylamidoboranediylbis{3-(2-methyl-cyclopenta[c]phenanthryl)}zirconium dichloride, diisopropylamidoboranediylbis(3-cyclopenta[c]phenanthryl)zirconium dichloride, diisopropylamidoboranediylbis(2-methyl-α-acenaphtho-1-indenyl)zirconium dichloride, diisopropylamidoboranediylbis(α-acenaphtho-1-indenyl)zirconium dichloride, diisopropylamidoboranediyl(2-methyl-4,5-benzo-1-indenyl) (2-methyl-1-indenyl)zirconium dichloride, phenylboranediylbis(2-methyl-4,5-benzo-1-indenyl)zirconium dichloride, phenylboranediylbis(4,5-benzo-1-indenyl)zirconium dichloride, phenylboranediylbis{1-(2-methylcyclopenta[1]phenanthryl)}zirconium dichloride, phenylboranediylbis(1-cyclopenta[1]phenanthryl)zirconium dichloride, a phenylboranediylbis{3-(2-methyl-cyclopenta[c]phenanthryl)}zirconium dichloride, phenylboranediylbis(3-cyclopenta[c]phenanthryl)zirconium dichloride, phenylboranediylbis(2-methyl-α-acenaphtho-1-indenyl)zirconium dichloride, phenylboranediylbis(α-acenaphtho-1-indenyl)zirconium dichloride, phenylboranediyl(2-methyl-4,5-benzo-1-indenyl)(2-methyl-1-indenyl)zirconium dichloride, diisopropylamidoboranediylbis(2-methyl-4-phenyl-1-indenyl)zirconium dichloride, diisopropylamidoboranediylbis(2-methyl-4-naphthyl-1-indenyl)zirconium dichloride, phenylboranediylbis(2-methyl-4-phenyl-1-indenyl)zirconium dichloride, phenylboranediylbis(2-methyl-4-naphthyl-1-indenyl)zirconium dichloride, may, for example, be mentioned.

Such a transition metal compound may be used in the form of any one of racemic, meso modification, or a mixture thereof, but preferably, a racemic modification is employed. Further, either a d-form or a l-form may be employed.

Further, among transition metal compound disclosed in WO00/20426 or U.S. Pat. No. 5,962,718, those having structures of the formula (1) may also be employed.

Among such transition metal compounds to be preferably employed in the present invention, preferred examples wherein Y is other than the above-mentioned substituted boron group, i.e. Y is a substituted methylene group, a substituted 1,2-ethanediyl group, a substituted 1,3-propanediyl group, a substituted silicon group, a substituted germylene group or a substituted aluminum group which has bonds to the two A and further has hydrogen or a $C_{1-20}$ hydrocarbon group as a substituent, will be shown below.

Dimethylsilanediylbis(2-methyl-1-indenyl)zirconium dichloride, dimethylsilanediylbis(2-methyl-4-phenyl-1-indenyl)zirconium dichloride, dimethylsilanediylbis(2-methyl-4-naphthyl-1-indenyl)zirconium dichloride, dimethylsilanediylbis{3-(2-furyl)-2,5-dimethylcyclopentadienyl}zirconium dichloride, dimethylsilanediylbis{3-(2-furyl)-1-indenyl}zirconium dichloride, 1,2-ethanediylbis(2-methyl-1-indenyl)zirconium dichloride, 1,2-ethanediylbis(2-methyl-4-phenyl-1-indenyl)zirconium dichloride, 1,2-ethanediylbis(2-methyl-4-naphthyl-1-indenyl)zirconium dichloride, dimethylsilanediylbis(2-methyl-4,5-benzo-1-indenyl)zirconium dichloride, diethylsilanediylbis(2-methyl-4,5-benzo-1-indenyl)zirconium dichloride, diphenylsilanediylbis(2-methyl-4,5-benzo-1-indenyl)zirconium dichloride, dimethylsilanediylbis(4,5-benzo-1-indenyl)zirconium dichloride, dimethylsilanediylbis{1-(2-methylcyclopenta[1]phenanthryl)}zirconium dichloride, dimethylsilanediylbis(1-cyclopenta[1]phenanthryl)zirconium dichloride, dimethylsilanediylbis{3-(2-methylcyclopenta[c]phenanthryl)}zirconium dichloride, dimethylsilanediylbis(3-cyclopenta[c]phenanthryl)zirconium dichloride, dimethylsilanediylbis(2-methyl-α-acenaphtho-1-indenyl)zirconium dichloride, dimethylsilanediylbis(α-acenaphtho-1-indenyl)zirconium dichloride and dimethylsilanediyl(2-methyl-4,5-benzo-1-indenyl)(2-methyl-1-indenyl)zirconium dichloride may, for example, be mentioned. Such a transition metal compound may be used in the form of any one of racemic, meso modification, or a mixture thereof, but a racemic modification is preferably employed. Further, either a d-form or a l-form may be employed.

Further, among transition metal compounds specifically exemplified in JP-A-6-184179, EP-0872492A2, JP-A-11-130808, JP-A-9-309925, JP-A-11-189618, JP-A-8-183814, WO00/43406, JP-A-6-100579, JP-A-6-49132, U.S. Pat. No.

5,616,664, JP-A-11-246582 and JP-A-11-279189, those having the above-mentioned substituted indenyl group structure, may also be mentioned.

Such a transition metal compound may be used in the form of any of racemic, meso modification, or a mixture thereof, but preferably, a racemic modification is employed. Further, either a d-form or a l-form may be employed.

Among transition metal compounds to be preferably used in the present invention, the following transition metal compounds may, for example, be mentioned in a case where one of A is a substituted indenyl group, and the other is a group selected from groups which have a nitrogen atom or an oxygen atom coordinated or directly bonded to metal M and, if necessary, a $C_{1-20}$ hydrocarbon group (said groups may further contain from 1 to 3 boron, silicon, phosphorus, selenium, sulfur, chlorine or fluorine atoms).

Dimethylsilanediyl(2-methyl-1-indenyl)(t-butylamido)titanium dichloride, dimethylsilanediyl(2,3-dimethyl-1-indenyl)(t-butylamido)titanium dichloride, dimethylsilanediyl(2-methyl-4,5-benzo-1-indenyl)(t-butylamido)titanium dichloride, dimethylsilanediyl(3-(2-methyl-cyclopenta[c]phenanthryl)(t-butylamido)titanium dichloride, dimethylsilanediyl(3-(1-cyclopenta[1]phenanthryl)(t-butylamido)titanium dichloride.

Diisopropylamidoboranediyl(2-methyl-1-indenyl)(t-butylamido)titanium dichloride, diisopropylamidoboranediyl(2,3-dimethyl-1-indenyl)(t-butylamido)titanium dichloride, diisopropylamidoboranediyl(2-methyl-4,5-benzo-1-indenyl)(t-butylamido)titanium dichloride, diisopropylamidoboranediyl(3-(2-methyl-cyclopenta[c]phenanthryl)(t-butylamido)titanium dichloride, diisopropylamidoboranediyl(3-(1-cyclopenta[1]phenanthryl)(t-butylamido)titanium dichloride.

Phenylboranediyl(2-methyl-1-indenyl)(t-butylamido)titanium dichloride, phenylboranediyl(2,3-dimethyl-1-indenyl)(t-butylamido)titanium dichloride, phenylboranediyl(2-methyl-4,5-benzo-1-indenyl)(t-butylamido)titanium dichloride, phenylboranediyl(3-(2-methyl-cyclopenta[c]phenanthryl)(t-butylamido)titanium dichloride, and phenylboranediyl(3-(1-cyclopenta[1]phenanthryl)(t-butylamido)titanium dichloride.

Further, among transition metal compounds disclosed in WO00/20426, WO99/14221, WO98/27103, U.S. Pat. No. 6,166,145 and JP-A-09-087313, transition metal compounds having one of the above-mentioned substituted indenyl group structures may, for example, be mentioned.

The organoaluminum compound to be used in the present invention is a known organoaluminum compound which has been used for polymerization together with an alumoxane or a boron compound. In the present invention, an organoaluminum compound represented by the following formula (2) is preferably employed.

$$Al(R)_3 \quad \text{Formula (2)}$$

Here, R each independently is hydrogen or $C_{2-20}$ hydrocarbon. Of these R, one or two may be halogen. Further, R is preferably a $C_{2-20}$ linear or branched alkyl, alkenyl, aryl, alkylaryl or arylalkyl group. Further, R may have a cyclic structure. When these R are hydrocarbon groups, they may contain from 1 to 5 nitrogen, silicon, phosphorus or halogen atoms. The plurality of R in the formula may have a bonding structure. Further, plurality of such organoaluminum compounds may be bonded via R.

Preferably, R each independently is hydrogen or a $C_{2-20}$ alkyl group. As a preferred example of such an organoaluminum compound, triethylaluminum, triisobutylaluminum, trioctylaluminum or trihexylaluminum may be mentioned. Particularly preferably, triisobutylaluminum will be used.

Further, as an example of a case where a plurality of organoaluminum compounds are bonded via R, a reaction product of an oligomer or polymer having a plurality of vinyl groups in the side chains or at the terminals, with an aluminum compound such as a monohydrogenated alkyl aluminum, may be mentioned. A hydrocarbon type oligomer or polymer is preferably employed. For example, a 1,2-polybutadiene, a polymer having butadiene units having 1,2-vinyl groups, or an oligomer or polymer having divinylbenzene units, may be employed. The molecular weight (Mn) of the oligomer or polymer to be used for the reaction with the aluminum compound is preferably from 500 to 200,000, more preferably from 500 to 30,000.

Further, as an example of a case where a plurality of organoaluminum compounds are bonded via R, a reaction product of a polyene having a plurality of vinyl groups with an aluminum compound such as a monohydrogenated alkyl aluminum may be mentioned. In such a case, meta, para or ortho divinylbenzene, or a mixture thereof, or an α-ω diene, may suitably be used. For example, p-divinylbenzene or m-divinylbenzene is preferably employed. The molecular weight of the polyene to be used for the reaction with the aluminum compound is not particularly limited, but is preferably less than 500.

Such an organoaluminum compound is preferably such that aluminum contained therein is within a range of more than ten times to 1,000,000 times, preferably within a range of more than 100 times to 100,000 times, most preferably within a range of more than 500 times to 100,000 times, by molar ratio, to the transition metal in the transition metal compound.

In a case where liquid phase polymerization is employed in the present invention, the amount of a Lewis basic substance (such as moisture) contained in the polymerization system, specifically in the polymerization solution, is preferably at most 30 ppm, particularly preferably at most 20 ppm. More preferably, the Lewis basic substance is moisture, and the amount of moisture contained in the polymerization system is at least 1 ppm and at most 30 ppm, most preferably at least 1 ppm and at most 20 ppm. The amount of such a Lewis basic substance is an amount contained in the polymerization system (the solvent and the monomer in the case of a polymerization solution) prior to the addition of the organoaluminum compound.

In a case where another polymerization method such as gas phase polymerization is to be employed, the mols of the Lewis basic substance (such as moisture) present in the polymerization-system, specifically in the reactor or in the catalyst, is preferably at most 1.0, particularly preferably at most 0.7, per mol of the aluminum atoms in the organic alkyl aluminum.

If the amount of the Lewis basic substance (moisture) exceeds such a level, the activity is likely to deteriorate, or the required amount of the organoaluminum to be used to obtain a prescribed polymerization activity tends to increase, whereby the economical superiority is likely to be lost.

The first mode of the present invention is a process for producing an olefin polymer characterized by polymerizing at least one olefin by means of a polymerization catalyst comprising a specific transition metal compound and a specific organoaluminum compound, as described above. In this specification, an olefin polymer is one including both concepts of an olefin polymer obtainable from one kind of an olefin and an olefin copolymer obtainable from at least two types of olefins.

Further, the second mode of the present invention is characterized in that an expensive alumoxane such as methylalumoxane which used to be employed as a co-catalyst, is not added to the catalyst system, and the polymerization catalyst of the present invention constituted by such a specific transition metal compound and a specific organoaluminum compound has a feature of presenting a remarkably high activity for a copolymer having a high molecular weight in the (co)polymerization of an olefin.

The olefin to be used for the process of the present invention may suitably be a $C_{2-20}$ α-olefin such as ethylene, propylene, 1-butene, 1-hexene, 4-methyl-1-pentene or 1-octene, a $C_{5-20}$ cyclic olefin such as cyclopentene, norbornene or norbornadiene, a $C_{8-20}$ aromatic vinyl compound such as styrene or various substituted styrenes such as p-methylstyrene, m-methylstyrene, o-methylstyrene, o-t-butylstyrene, m-t-butylstyrene, p-t-butylstyrene, p-chlorostyrene, o-chlorostyrene or α-methylstyrene. Further, two or more of these olefins may be used. As the olefin, ethylene, propylene, 1-hexene or 1-octene is preferred.

Further, it is also possible to copolymerize at least one $C_{4-30}$ diene or polyene having a plurality of carbon double bonds in its molecule, as the case requires. Examples of such a diene or polyene include, for example, ethylidene norbornene, various isomers of vinyl cyclohexene, butadiene, 1,4-hexadiene, 1,5-hexadiene, and ortho-, meta- or para-various divinyl benzenes. The divinylbenzenes may be a mixture of various isomers. The content of such a diene or polyene is usually from 0.001 mol % to 3 mol %, preferably from 0.01 mol % to 0.5 mol %, of the total.

Further, in the present invention, a $C_{2-20}$ oxygen-containing or nitrogen-containing monomer may be copolymerized, as the case requires. As such an oxygen-containing or nitrogen-containing monomer, acrylamide, methyl acrylate, methyl methacrylate or acrylonitrile may, for example, be mentioned. Such an oxygen-containing or nitrogen-containing monomer may be such that the polar group may be protected by an organoaluminum compound, as disclosed in known literatures. The content of such an oxygen-containing or nitrogen-containing monomer is not particularly limited, but it is usually from 0.001 mol % to 20 mol %, preferably from 0.01 mol % to 5 mol %, of the total.

By the process of the present invention, an extremely high polymerization activity which has not heretofore been observed, may be obtained in the polymerization or copolymerization of an olefin such as ethylene or propylene. Further, the obtainable polymer or copolymer may have a practically adequate molecular weight.

Further, in this specification, in a case where the olefin polymer is a copolymer, the comonomer content in the copolymer means the content of units derived from the comonomer contained in the copolymer, and the comonomer means a copolymerized monomer component other than the main component.

In the production of a copolymer of the present invention, the above olefin, the transition metal compound as a metal complex and the organoaluminum compound are contacted, but the order of contact or the contacting method may be any optional conventional method.

As a method for the above polymerization or copolymerization, there may be a method wherein polymerization is carried out in a liquid monomer without using any solvent, or a method of using a single or mixed solvent of a saturated aliphatic or aromatic hydrocarbon or a halogenated hydrocarbon, such as pentane, hexane, heptane, cyclohexane, benzene, toluene, ethylbenzene, xylene, chlorinated benzene, chlorinated toluene, methylene chloride or chloroform. Preferably, a mixed alkane solvent, cyclohexane, toluene or ethylbenzene is used. The polymerization method may be either solution polymerization or slurry polymerization. Further, a known method such as batch polymerization, continuous polymerization, preliminary polymerization or multistage polymerization, may be employed, as the case requires.

It is also possible to employ linear or loop single or connected plurality of pipe polymerization. In such a case, the pipe polymerizer may have a known mixer such as a dynamic or static mixer with a heat removal function, or a known cooler such as a cooler provided with a fine tube for heat removal. Further, it may have a batch type preliminary polymerizer.

Further, a method of gas phase polymerization or the like may be employed. The gas phase polymerization is economical and preferred in a case where a homopolymer of an α-olefin having at most 6 carbon atoms, such as ethylene or propylene, or a copolymer thereof, is to be produced. In the gas phase polymerization, the transition metal compound and, if necessary, the organoaluminum compound, may be supported on a known optional carrier.

The polymerization can be carried out at a temperature within a range of from −70° C. to 300° C., but usually a temperature from 70° C. to 200° C. is suitable. At a polymerization temperature lower than 70° C., no adequate polymerization activity can be obtained, such being industrially disadvantageous. If it exceeds 200° C., decomposition of the metal complex is likely to take place, such being undesirable. Further, industrially preferably, it is from 80° C. to 180° C., particularly preferably from 90° C. to 150° C.

The polymerization activity at that time is at least 100× $10^6$ (g/mol–Zr·h), preferably at least 1000×$10^6$ (g/mol–Zr·h).

The pressure during the polymerization is suitably from atmospheric pressure to 1000 atm, preferably from 10 to 300 atm, particularly industrially preferably from 10 to 100 atm.

The transition metal compound and the organoaluminum compound may be mixed and adjusted outside the polymerizer or may be mixed in the polymerizer at the time of polymerization.

Now, the olefin polymer obtained by the process of the present invention will be described.

The olefin polymer obtained by the process of the present invention is a homopolymer made of a $C_{2-20}$ α-olefin monomer, a $C_{5-20}$ Cyclic olefin monomer or a $C_{8-20}$ aromatic vinyl compound, or a copolymer made of a plurality of monomers selected from such monomers. Preferably, it is an olefin polymer such as polyethylene, polypropylene or polybutene, an ethylene/α-olefin copolymer such as an ethylene/propylene copolymer, an ethylene/1-butene copolymer, an ethylene/1-hexene copolymer or an ethylene/1-octene copolymer, an ethylene/cyclic olefin copolymer such as an ethylene/norbornene copolymer, or an ethylene/aromatic vinyl compound copolymer such as an ethylene/styrene copolymer of an ethylene/styrene/butene copolymer. Further, it may be an atactic polymer or a polymer having a stereoregularity such as isotactic, syndiotactic or hemiisotactic.

Further, the above-mentioned diene or polyene may be copolymerized. As such an example, an ethylene/ethylidene norbornene copolymer, an ethylene/propylene/ethylidene norbornene copolymer, an ethylene/propylene/butadiene copolymer, an ethylene/propylene/divinylbenzene copolymer, an ethylene/1-octene/divinylbenzene copolymer, an ethylene/styrene/ethylidene norbornene copolymer, an ethylene/styrene/butadiene copolymer, an ethylene/styrene/divinylbenzene copolymer, an ethylene/1-butene/styrene/divinylbenzene copolymer or an ethylene/1-octene/styrene/divinylbenzene copolymer may, for example, be mentioned. Such a diene or polyene-containing aromatic vinyl compound/olefin copolymer can be used suitably for the cross copolymer disclosed in WO00/37517 or WO01/19881.

The molecular weight of the olefin polymer obtained by the process of the present invention is from 500 to 1,000,000 by weight average molecular weight (Mw), and taking into consideration the mechanical properties or processability of the polymer, it is preferably from 30,000 to 500,000. Further, the molecular weight distribution (Mw/Mn) is from 1.2 to 10, preferably from 1.2 to 6, most preferably from 1.5 to 4. Here, the weight average molecular weight is a molecular weight calculated as polystyrene obtained by GPC employing standard polystyrene. The same applies in the following description.

In the case of an olefin copolymer containing ethylene as the main component, its density usually shows a value of at most 0.97 and at least 0.80 g/cm$^3$. Further, the melting point by DSC may take a value of at least 70° C. and at most 140° C., preferably at least 90° C. and at most 135° C.

Further, by optionally changing the polymerization conditions, the polymerization method or the polymerization catalyst, an olefin polymer can be produced whether it is a polymer containing substantially no long chain branched structure i.e. among 1000 carbon atoms of the polymer, branched carbon being less than 0.1, or a polymer having a long chain branched structure, i.e. among 1000 carbon atoms of the polymer, the branched carbon being at least 0.1.

Such a long chain branched structure of the polymer can be ascertained, for example, from the relation between the molecular weight distribution (Mw/Mn) of the polymer and the ratio ($I_{10}/I_2$) of melt flow rates measured by changing the load to 10 kg and 2 kg. Further, the branched structure or its proportion can be ascertained also by the 13C-NMR spectrum.

Especially by the process of the present invention, many polymers having long chain branched structures can be produced by preferably employing a transition metal compound wherein Y is the above-mentioned substituted boron group and by adopting suitable polymerization conditions.

Such a long chain branched structure can be confirmed by high $I_{10}/I_2$. Specifically, a polymer is obtainable whereby the relation between the molecular weight distribution (Mw/Mn) obtained by GPC (gel permeation chromatography) and $I_{10}/I_2$ satisfies the following formula.

30 ≧ $MFI$ ≧ 1.25 m+6.25

10 ≧ m ≧ 2.

MFI: Ratio of MFR under loads of 10 kg and 2 kg ($I_{10}/I_2$)
M: Molecular weight distribution by GPC (Mw/Mn)

By using the process of the present invention, many polymers having long chain branched structures satisfying the above relation can be produced without using a diene or polyene by using one or a plurality of olefin monomers such as $C_{2-20}$ α-olefin monomers, $C_{5-20}$ cyclic olefin monomers or $C_{8-20}$ aromatic vinyl compounds, as the starting material. Preferably, a $C_{2-20}$ α-olefin monomer, most preferably ethylene, is used as the starting material.

Further, in the scope of the olefin polymer obtained by the process of the present invention, an oligomer or a multimer such as a dimer, a trimer or a tetramer, lower than the above-mentioned weight average molecular weight, is included. In the process of the present invention, such an oligomer or a multimer such as a dimer, can also be obtained without using an expensive co-catalyst, by selecting the transition metal compound or the organoaluminum compound to be used, or by increasing the reaction temperature (the polymerization temperature), or by using a known chain transfer agent such as hydrogen. Such an oligomer is useful as a modifier or an additive to a resin, and a multimer such as a dimer or a trimer having an unsaturated bond, is useful as a co-monomer for a polyolefin.

Now, the third mode of the present invention will be described. The third mode of the present invention is a process for producing an olefin polymer characterized by polymerizing at least one olefin by means of a polymerization catalyst prepared by adding a limited amount of an alumoxane to a polymerization catalyst comprising a specific transition metal compound represented by the above formula (1) and a specific organoaluminum compound represented by the above formula (2). By adding a limited amount of the alumoxane, it is possible to improve the durability of the catalyst against a catalyst poison or to further improve the polymerization activity while suppressing an increase of the catalyst cost at not higher than a certain level.

As the alumoxane to be used in the process of the present invention, a known one which has been used in combination with a transition metal compound, may be used.

Further, an aluminoxane (or an alumoxane) represented by the following formula (5) or (6) is preferred.

Formula (5)

In the formula, R is a $C_{1-10}$ alkyl group, a $C_{6-20}$ aryl group or hydrogen, m is an integer of from 2 to 100, provided that the respective R may be the same or different from one another.

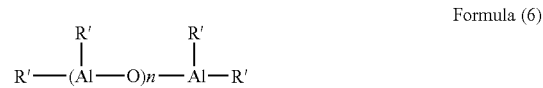

Formula (6)

In the formula, R' is a $C_{1-10}$ alkyl group, a $C_{6-20}$ aryl group or hydrogen, and n is an integer of from 2 to 100. The respective R' may be the same or different from one another.

Particularly preferred is methylalumoxane, triisobutylalumoxane or methylalumoxane modified by a triisobutyl group.

The amount of such an alumoxane to be used, is limited depending upon the amount of the organoaluminum compound to be used. It is thereby characterized in that the total catalyst cost including a co-catalyst can be reduced than ever. Namely, the molar amount of aluminum derived from the alumoxane to be used is at most 80%, preferably at most 50%, most preferably at most 20%, based on the molar amount of aluminum derived from the organoaluminum compound to be used. If an alumoxane is added beyond this, the catalyst cost will increase, and a merit of the present invention cannot be obtained.

EXAMPLES

Now, the present invention will be described with reference to Examples, but it should be understood that the present invention is by no means restricted to the following Examples.

Analyses of copolymers obtained in the respective Examples and Comparative Examples were carried out by the following means.

The 13C-NMR spectrum was measured by using α-500 manufactured by JEOL Ltd. employing a heavy chloroform solvent or a heavy 1,1,2,2-tetrachloroethane solvent and using TMS as a standard. Here, the measurement using TMS as a standard is the following measurement. Firstly, using TMS as a standard, a shift value of the central peak of the triplet 13C-NMR peaks of heavy 1,1,2,2-tetrachloroethane was determined. The shift value of the triplet center peak of heavy 1,1,2,2-tetrachloroethane was 73.89 ppm. Then, a copolymer was dissolved in heavy 1,1,2,2-tetrachloroethane, and the 13C-NMR was measured, and each peak shift value was calculated as the triplet center peak of heavy 1,1,2,2-tetrachloroethane was 73.89 ppm. The measurement was carried out by dissolving the polymer in an amount of 3 weight/volume % in such a solvent.

The determination of the commoner content in the copolymer was carried out by $^1$H-NMR, and as the instruments, α-500 manufactured by JEOL Ltd. and AC-250 manufactured by BRUCKER Company were used. Using a heavy chloroform solvent or heavy 1,1,2,2-tetrachloroethane, the measurement was carried out by using TMS as a standard.

The molecular weight of the polymer or the copolymer was measured at 145° C. by means of HLC-8121 apparatus, manufactured by TOSOH CORPORATION using o-dichlorobenzene as a solvent.

The DSC measurement was carried out by means of DSC200, manufactured by Seiko Instruments INC. in a $N_2$ stream at a temperature-raising rate of 10° C./min. Using 10 mg of a sample, it was heated (1st run) to 240° C. at a temperature-raising rate of 20° C./min, then rapidly cooled to −100° C. by liquid nitrogen (pretreatment), then, the temperature was raised from −100° C. at a rate of 10° C./min, and the DSC measurement was carried out up to 240° C. (2nd run), whereby the melting point, and the heat of fusion and the glass transition point of the crystals were obtained.

MFR was measured in accordance with JIS K7210. The measuring temperature was 200° C., and the measurement was carried out under a load of 2 kg.

Reference Example 1

Preparation of Complex rac-Phenylboranediylbis{1-(2-methyl-cyclopenta[1]phenanthryl)}zirconium dichloride, another name: rac-phenylborylbis{1-(2-methyl-cyclopenta[1]phenanthryl)}zirconium dichloride, was prepared by the following method.

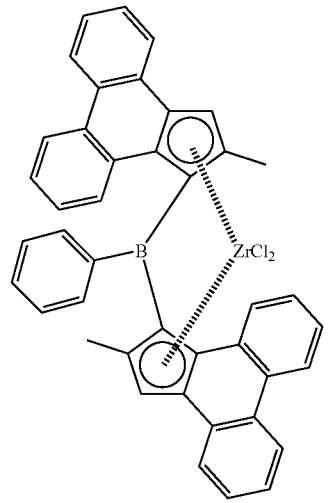

1H-2-methyl-cyclopenta[1]phenanthrene was prepared by a known method such as one in Organometallics, 16, 3413 (1997).

rac-Phenylboranediylbis{1-(2-methyl-cyclopenta[1]phenanthryl)}zirconium dichloride was prepared as follows.

Preparation of Ligand

The ligand was prepared with reference to a synthesis of rac-phenylboranediylbis(1-indenyl)zirconium dichloride as disclosed in U.S. Pat. No. 5,962,718, provided that the indene used was changed to 1H-(2-methyl-cyclopenta[1]phenanthrene).

Namely, under an argon stream, 50 ml of a diethyl ether solution of 5.0 g (21.7 mmol) of 1H-(2-methyl-cyclopenta[1]phenanthrene) was cooled to 0° C., and then, a n-butyl-lithium/hexane solution (21.7 mmol as butyl lithium) was added and stirred at room temperature for 3 hours. A diethyl ether solution of a lithium salt of 1H-(2-methyl-cyclopenta[1]phenanthrene) was dropwise added to 50 ml of a diethyl ether solution of $PhBCl_2$ (10.8 mmol) cooled to −75° C., and stirred overnight while returning the temperature gradually to room temperature. The supernatant was removed, and the remaining solid was dried to obtain 6.45 g (crude yield: 109%, containing a salt and impurities) of a ligand phenylboranediylbis{1-(2-methyl-cyclopenta[1]phenanthrene)}.

Preparation of Zr Complex

In an argon atmosphere, a toluene solution (40 ml) of 3.08 g (5.65 mmol) of the ligand was added to a toluene solution (40 ml) of 1.54 g (5.77 mmol) of $Zr(NMe_2)_4$, followed by stirring under reflux for 4 hours. Thereafter, the solvent was distilled off under reduced pressure, and toluene (80 ml) and trimethylsilyl chloride (92.3 mmol) were added, followed by stirring overnight. The solvent was distilled off under reduced pressure, followed by washing with pentane and extraction with methylene chloride. The filtrate was concentrated and precipitated crystals were collected by filtration. Crystals were washed with diethyl ether to remove impurities, whereupon diethyl ether attached to crystals was removed by drying under reduced pressure at from 70° C. to 120° C. The crystals were again extracted with methylene chloride, followed by filtration. The filtrate was concentrated, and precipitated crystals were collected by filtration, whereby 0.2 g of clear yellow crystals of rac-phenylboranediylbis{1-(2-methyl-cyclopenta[1]phenanthryl)}zirconium dichloride were obtained.

The obtained complex showed peaks at the following positions in the 1H-NMR measured by using TMS as a standard. 1HNMR (400 MHz, CDCl$_3$) δ 1.71 ppm (methyl group s, 6H), 7.26 (d, 2H), 7.12–8.79 ppm (many peaks, 21H).

Further, no peak of diethyl ether, a Lewis base or the like was observed. Namely, this indicates that no such a compound was coordinated to the boron atom.

Further, proton peaks of the methyl group as a ligand and the cyclopentadienyl ring as a ligand were equivalent (they were respectively observed as 6H of singlet and 2H of doublet), which indicates that the three bonds of the ligand boron are located in a plane, and the two 2-methyl-cyclopenta[1]phenanthryl groups are in an equal positional relation to the phenyl substituent of boron.

Reference Example 2

Preparation of Complex

Diisopropylaminoboranediylbis(2-methyl-4,5-benzo-1-indenyl)zirconium dichloride (another name: diisopropylamidoboranebis(2-methyl-4,5-benzo-1-indenyl)zirconium dichloride) was prepared as follows.

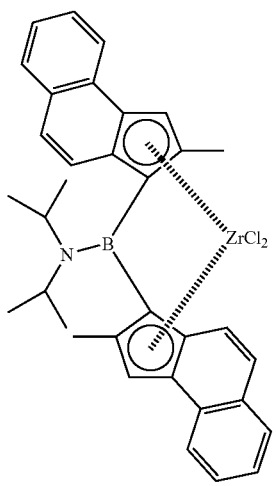

2-Methyl-4,5-benzoindene{1-H or 3-H-2-methylbenzo(e) indene} was prepared by a known method.

It was prepared with reference to the synthesis of rac-diisopropylaminoboranediylbis(1-indenyl)zirconium dichloride as disclosed in Organometallics 1999, 18, 2288, provided that the indene used was changed to 2-methyl-4,5-benzoindene.

The obtained complex was yellow crystals and showed peaks at the following positions in the 1H-NMR measured by using TMS as a standard and CDCl$_3$ as a solvent. δ1.56 ppm (d, 6H), 1.58 ppm (d, 6H), 2.28 ppm (s, 6H), 4.33 ppm (Hept, 2H), 7.17–7.98 (many peaks, 14H).

Reference Example 3

Preparation of Complex rac-Diisopropylaminoboranediylbis(4,5-benzo-1-indenyl)zirconium dichloride (another name: rac-diisopropylamidoboranebis(4,5-benzo-1-indenyl)zirconium dichloride) was prepared by the following method.

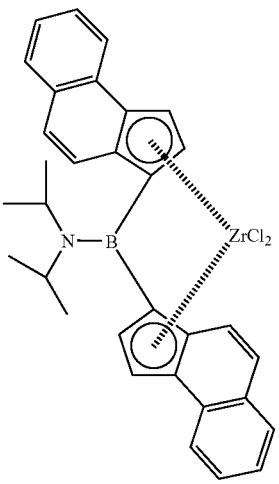

4,5-benzoindene was prepared by a known method.

The rac-diisopropylaminoboranediylbis(4,5-benzo-1-indenyl)zirconium dichloride was prepared with reference to the synthesis of rac-diisopropylaminoboranediylbis(1-indenyl)zirconium dichloride as disclosed in Organometallics 1999, 18, 2288, provided that the indene used was changed to 4,5-benzoindene.

The obtained complex showed peaks at the following positions in the 1H-NMR measured by using TMS as a standard and CDCl$_3$ as a solvent. δ1.50 ppm (d, 6H), 1.56 ppm (d, 6H), 4.23 (Hept, 2H), 5.89 (d, 2H) 6.99–8.04 (many peaks, 14H)

Example 1

Polymerization of Ethylene

Polymerization was carried out by means of an autoclave having a capacity of 10 L and equipped with a stirrer and a jacket for heating/cooling. 4800 ml of toluene (guaranteed reagent manufactured by Junsei Chemical Co., Ltd.) was charged and heated, and stirred at an internal temperature of 70° C. Moisture in the autoclave or in the toluene was removed by bubbling about 200 L of nitrogen having water removed by a molecular sieve 3A column. Then, 8.4 mmol of triisobutylaluminum (n-hexane solution, manufactured by Kanto Chemical Co., Inc.) was added. The internal temperature was raised to 90° C. immediately, and ethylene was introduced. After the pressure was stabilized at 1.1 MPa (10 kg/cm$^2$G), about 50 ml of a toluene solution having 0.3 mmol of rac-diisopropylaminoboranediylbis(2-methyl-4,5-benzo-1-indenyl)zirconium dichloride and 0.84 mmol of triisobutylaluminum dissolved, was added to the autoclave from a catalyst tank installed above the autoclave. During the polymerization, the internal temperature increased temporarily to 119° C. by abrupt heat generation. Further, the ethylene pressure temporarily decreased to 0.85 MPa by abrupt polymerization. The polymerization was completed in a polymerization time of 5 minutes, but from the supply rate of ethylene (during the polymerization, the ethylene supply rate and the supplied amount were monitored by a mass flow controller), the polymerization was in progress without being deactivated. The obtained polymerization solution was introduced gradually in small amounts into excess methanol which was vigorously stirred, to let the formed polymer precipitate. The polymer was dried under vacuum at 80° C. until no more weight change was observed, whereby 215 g of polyethylene was obtained.

Examples 2 to 4

Under the conditions as identified in Table 1, the polymerization and post treatment were carried out in the same manner as in Example 1 by changing the transition metal compound to be used.

Example 5

Polymerization was carried out by means of an autoclave having a capacity of 10 L and equipped with a stirrer and a jacket for heating/cooling. 4700 ml of toluene (guaranteed reagent manufactured by Junsei Chemical Co., Ltd.) and 100 ml of 1-octene were charged and heated, and stirred at an internal temperature of 70° C. Moisture in the autoclave or in the toluene was removed by bubbling about 200 L of nitrogen dehydrated by a molecular sieve 3A column. Then, 8.4 mmol of triisobutylaluminum (n-hexane solution, manufactured by Kanto Chemical Co., Inc.) was added. The internal temperature was raised to 90° C. immediately, and ethylene was introduced. When the pressure was stabilized at 1.1 MPa (10 kg/cm$^2$G), 50 ml of a toluene solution having 1.0 µmol of rac-diisopropylaminoboranediylbis(2-methyl-4,5-benzo-1-indenyl)zirconium dichloride and 0.84 mmol of triisobutylaluminum dissolved, was added to the autoclave from a catalyst tank installed above the autoclave. During the polymerization, the internal temperature increased temporarily to 122° C. by abrupt heat generation. Further, the ethylene pressure temporarily decreased to 1.03 MPa due to abrupt polymerization. The polymerization was completed in a polymerization time of 8 minutes, but from the supply rate of ethylene, the polymerization was in progress without being deactivated. The obtained polymerization solution was introduced gradually in small amounts into excess methanol which was vigorously stirred, to let the formed polymer precipitate. The polymer was dried under vacuum at 80° C. until no more weight change was observed, whereby 237 g of an ethylene/octene copolymer was obtained.

Example 6

Polymerization was carried out in the same manner as above under the conditions as identified in Table 2, to obtain an ethylene/octene copolymer as identified in Table 4.

Examples 7 to 9

Under the conditions as shown in Table 5, polymerization was carried out in the same manner as in Example 5 using rac-diisopropylaminoboranediylbis(2-methyl-4,5-benzo-1-indenyl)zirconium dichloride as a catalyst and changing the amount of octene used. However, 1-octene was used after purifying it by passing it through an acidic activated aluminum oxide (manufactured by MERCK) column.

Example 10

Under the conditions as identified in Table 5, polymerization of ethylene was carried out by using rac-dimethylsilanediylbis(2-methyl-4,5-benzo-1-indenyl)zirconium dichloride as a catalyst.

The transition metal compounds used, are as follows.

A: rac-diisopropylaminoboranediylbis(2-methyl-4,5-benzo-1-indenyl)zirconium dichloride, B: rac-dimethylsilanediylbis(2-methyl-4,5-benzo-1-indenyl)zirconium dichloride, C: rac-phenylboranediylbis{1-(2-methyl-cyclopenta[1]phenanthryl)}zirconium dichloride, D: rac-diisopropylaminoboranediylbis(4,5-benzo-1-indenyl)zirconium dichloride.

The transition metal compound B was prepared in accordance with known method.

Water Content in the Polymerization Solution

In the polymerization test in each Example, a part of the solution in the autoclave was sampled before adding triisobutylaluminum, and the water content was quantified by a Karl Fischer method. As a result, it was 13 ppm in Example 1, 6 ppm in Example 7, and from about 6 to 18 ppm in Examples 2 to 4 and 8 to 10.

The amounts of obtained polymers and the contents of comonomers are shown in Tables 1, 2 and 5, and the analytical values of the obtained polymers are shown in Tables 3, 4 and 6.

TABLE 1

| Ex. No. | Catalyst | Amount of catalyst (µmol) | TIBA (mmol) | Amount of solvent (ml) | Ethylene pressure (MPa) | Polymerization temperature (° C.) | Polymerization time (min) | Obtained amount (g) | Activity (g/mol-Zr · h)/10$^6$ |
|---|---|---|---|---|---|---|---|---|---|
| Ex. 1 | A | 0.3 | 8.4 | 4800 | 1.1–0.85 | 90–119 | 5 | 215 | 8600 |
| Ex. 2 | B | 2.1 | 8.4 | 4800 | 1.1–0.80 | 90–115 | 5 | 222 | 1269 |
| Ex. 3 | C | 1 | 8.4 | 4800 | 1.1–0.97 | 90–114 | 5 | 214 | 2568 |
| Ex. 4 | D | 1 | 8.4 | 4800 | 1.1–0.91 | 90–111 | 5 | 208 | 2496 |

TIBA: triisobutylaluminum

TABLE 2

| Ex. No. | Catalyst | Amount of catalyst (μmol) | TIBA (mmol) | Amount of solvent (ml) | 1-octene (ml) | Ethylene pressure (MPa) | Polymerization temperature (° C.) | Polymerization time (min) | Obtained amount (g) | Activity (g/mol-Zr · h)/10$^6$ |
|---|---|---|---|---|---|---|---|---|---|---|
| Ex. 5 | A | 1 | 8.4 | 4700 | 100 | 1.1–1.03 | 90–122 | 8 | 237 | 1778 |
| Ex. 6 | B | 1 | 8.4 | 4700 | 100 | 1.1–1.03 | 90–116 | 5 | 203 | 2436 |

TIBA: triisobutylaluminum

TABLE 3

| Ex. No. | Mw/10$^4$ | Mw/Mn | Melting point ° C. | MFR (200° C., load: 2 kg) g/10 min |
|---|---|---|---|---|
| Ex. 1 | 24.8 | 3.3 | 139.5 | 0.03 |
| Ex. 2 | 37.2 | 3.4 | 141 | 0.01 |
| Ex. 3 | 16.7 | 3.6 | 135.3 | 0.36 |
| Ex. 4 | 12.4 | 2.9 | 134.2 | 7.53 |

TABLE 4

| Ex. No. | Mw/10$^4$ | Mw/Mn | Melting point (° C.) | 1-octene content (mol %) | MFR (200° C., load: 2 kg) g/10 min |
|---|---|---|---|---|---|
| Ex. 5 | 21.6 | 3.4 | 119.8 | 1.4 | 0.34 |
| Ex. 6 | 32.3 | 2.9 | 120.9 | 1.1 | 0.12 |

TABLE 5

| Ex. No. | Catalyst | Amount of catalyst (μmol) | TIBA (mmol) | Amount of solvent (ml) | 1-octene (ml) | Ethylene pressure (MPa) | Polymerization temperature (° C.) | Polymerization time (min) | Obtained amount (g) | Activity (g/mol-Zr · h)/10$^6$ |
|---|---|---|---|---|---|---|---|---|---|---|
| Ex. 7 | A | 0.4 | 4.2 | 4700 | 100 | 1.1 | 95–119 | 5 | 200 | 6000 |
| Ex. 8 | A | 0.3 | 8.4 | 4400 | 400 | 1.1 | 86–97 | 10 | 197 | 3940 |
| Ex. 9 | A | 0.3 | 8.4 | 4000 | 800 | 1.1 | 89–97 | 30 | 210 | 1400 |
| Ex. 10 | B | 0.3 | 8.4 | 4800 | 0 | 1.1 | 90–97 | 10 | 107 | 2140 |

TIBA: triisobutylaluminum

TABLE 6

| Ex. No. | Mw/10$^4$ | Mw/Mn | Melting point (° C.) | 1-octene content (mol %) | MFR (200° C., load: 2 kg) g/10 min |
|---|---|---|---|---|---|
| Ex. 7 | 20.6 | 3.3 | 121.8 | 1.2 | 0.56 |
| Ex. 8 | 20.5 | 4.0 | 93.6 | 4.3 | 0.82 |
| Ex. 9 | 17.7 | 3.7 | 66.7 | 9.1 | 2.3 |
| Ex. 10 | 32.2 | 3.2 | 140 | 0 | — |

With respect to the copolymer obtained in Example 3, MFR were measured under loads of 2 kg and 10 kg at a measuring temperature of 200° C. in accordance with JIS K7210 and found to be 0.36 g/10 min and 6.7 g/10 min, respectively. As a result, the ratio of MFR under loads 10 kg and 2 kg ($I_{10}/I_2$) of the same copolymer having a molecular weight distribution (Mw/Mn) of 3.6, was 18.6. This value satisfies the following formula.

$$30 \geq MFI \geq 1.25m + 6.25,$$

$$10 \geq m \geq 2.$$

MFI: Ratio of MFR under loads of 10 kg and 2 kg ($I_{10}/I_2$)
m: Molecular weight distribution by GPC (Mw/Mn)

INDUSTRIAL APPLICABILITY

According to the process of the present invention, an olefin polymer can be produced at a very high activity without using an expensive aluminoxane or boron compound, and the industrial value of the process is very high.

What is claimed is:

1. A process for producing an olefin polymer, comprising:
polymerizing at least one olefin in the presence of a polymerization catalyst comprising an alumoxane and at least one transition metal compound selected from the group consisting of transition metal compounds represented by the following formula (1); and
an organoaluminum compound represented by the following formula (2):

Formula (1)

wherein each A is a substituted indenyl group, or one of A is a substituted indenyl group and the other is a group selected from groups which have a nitrogen atom or an oxygen atom coordinated or directly bonded to metal M and, if necessary, a $C_{1-20}$ hydrocarbon group; said groups may further contain from 1 to 3 boron, silicon, phosphorus, selenium, sulfur, chlorine or fluorine atoms, and in a case where each A is a substituted indenyl group, the two A may be the same or different;
wherein Y is a substituted silicon group or a substituted boron group, which has bonds to the two A and further has hydrogen or a $C_{1-20}$ hydrocarbon group as a substituent, the substituent in Y may contain from 1 to 5 nitrogen, boron, silicon, phosphorus, selenium, oxygen, sulfur, chlorine or fluorine atoms, or may have a cyclic structure;

X each independently is hydrogen, halogen, a $C_{1-15}$ alkyl group, a $C_{3-20}$ alkenyl group, a $C_{6-10}$ aryl group, a $C_{8-12}$ alkylaryl group, a silyl group having a $C_{1-4}$ hydrocarbon substituent, a $C_{1-10}$ alkoxy group, or an amido or amino group having hydrogen or a $C_{1-22}$ hydrocarbon substituent; n is 0, 1 or 2; and when a plurality of X are present, they may be bonded to one another, and M is zirconium, hafnium or titanium;

$$Al(R)_3 \quad \text{Formula (2)}$$

wherein R each independently is hydrogen or $C_{2-20}$ hydrocarbon, provided that among these R, one or two may be halogen; R may have a cyclic structure; when these R are hydrocarbon groups, they may contain from 1 to 5 nitrogen, silicon, phosphorus or halogen atoms; a plurality of R in the formula may have a bonding structure; and a plurality of such organoaluminum compounds may be bonded via R;

wherein a molar amount of aluminum derived from the alumoxane in the polymerization catalyst is at most 80% based on the molar amount of aluminum derived from the organoaluminum compound;

wherein the amount of a Lewis basic substance in a polymerization solution is at most 30 ppm;

wherein the polymerization activity is at least $1000 \times 10^6$ g/mol-M·h.

2. The process for producing an olefin polymer according to claim 1, wherein the substituted indenyl group is represented by the following formulae (3-1) or (3-2):

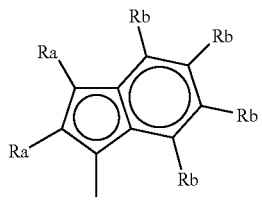

Formula (3-1)

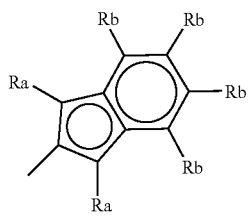

Formula (3-2)

wherein in the formulae (3-1) and (3-2), Ra each independently is hydrogen, halogen, a hydroxyl group, an amine group or a $C_{1-20}$ hydrocarbon group; the hydrocarbon group may contain from 1 to 3 halogen, silicon, phosphorus, oxygen, boron, nitrogen, sulfur or selenium atoms; and they may have a structure of an $OSiR_3$ group, a $SiR_3$ group, an $NR_2$ group, an OH group, an SR group, a SeR group, an OR group or a $PR_2$ group, wherein each R is a $C_{1-10}$ hydrocarbon group; and Rb each independently is hydrogen, halogen, a hydroxyl group, an amine group or a $C_{1-20}$ hydrocarbon group; the hydrocarbon group may contain from 1 to 3 halogen, silicon, phosphorus, oxygen, boron, nitrogen, sulfur or selenium groups; they may have a structure of an $OSiR_3$ group, a $SiR_3$ group, an $NR_2$ group, an OH group, an SR group, a SeR group, an OR group or a $PR_2$ group, wherein each R is a $C_{1-10}$ hydrocarbon group; and further, adjacent substituents of such hydrocarbons may be united to form a single or plural 5- to 8-membered cyclic aromatic rings or aliphatic rings;

provided that at least one of Ra is not hydrogen, or at least one of Rb is not hydrogen.

3. The process for producing an olefin polymer according to claim 2, wherein the two A in the formula (1) are substituted indenyl groups represented by the formulae (3-1) or (3-2), and in this case, the two A may be the same or different.

4. The process for producing an olefin polymer according to claim 1, wherein at least one A or the two A in the formula (1) are any one of substituted benzoindenyl groups which may have substituents, represented by the formulae (4-1) to (4-3), and in this case, the two A may be the same or different:

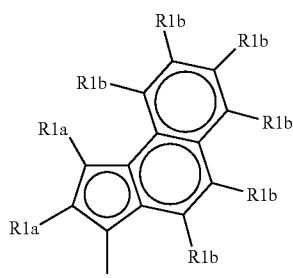

Formula (4-1)

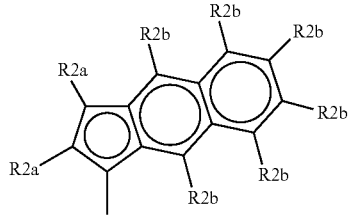

Formula (4-2)

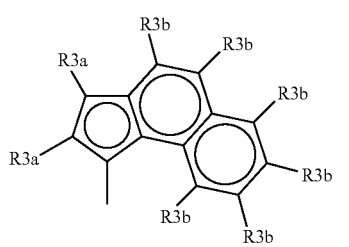

Formula (4-3)

wherein in the above formulae (4-1) to (4-3), R1a, R1b, R2a, R2b, R3a and R3b each independently is hydrogen, halogen, a hydroxyl group, an amine group or a $C_{1-20}$ hydrocarbon group; said hydrocarbon groups may contain from 1 to 3 halogen, silicon, phosphorus, oxygen, boron, nitrogen, sulfur or selenium atoms; they may have a structure of a $OSiR_3$ group, a $SiR_3$ group, an $NR_2$ group, an OH group, an OR group, an SR group, a SeR group or a $PR_2$ group (each R is a $C_{1-10}$ hydrocarbon group); each $R_1a$ independently, each R1b independently, each R2a independently, each R2b independently, each R3a independently and each R3b independently, may be the same or different; and further, adjacent substituents may be united to form a single or plural 5- to 8-membered cyclic aromatic rings or aliphatic rings.

5. The process for producing an olefin polymer according to claim 1, wherein the organoaluminum compound is triisobutyl aluminum.

6. The process for producing an olefin polymer according to claim 1, wherein the amount of aluminum in the organoaluminum compound is within a range of from 10 to 100,000 times by molar ratio based on the transition metal in the transition metal compound.

7. The process for producing an olefin polymer according to claim 1, wherein the olefin polymer exhibits a relation between the molecular weight distribution (Mw/Mn) obtained by GPC (gel permeation chromatography) and the ratio ($I_{10}/I_2$) of the melt flow rates measured by changing the load to 10 kg and 2 kg, satisfies the following formulae:

$$30 > MFI > 1.25\ m + 6.25,$$

$$10 > m > 2;$$

wherein MFI is the ratio ($I_{10}/I_2$) of MFR under loads of 10 kg and 2 kg, and m is the molecular weight distribution (Mw/Mn) by GPC.

8. The process for producing an olefin polymer according to claim 1, wherein the molar amount of aluminum derived from the alumoxane is at most 50% based on the molar amount of aluminum derived from the organoaluminum compound.

9. The process for producing an olefin polymer according to claim 1, wherein the molar amount of aluminum derived from the alumoxane is at most 20% based on the molar amount of aluminum derived from the organo aluminum compound.

10. A process for producing an olefin polymer, comprising:
polymerizing at least one olefin in the presence of a polymerization catalyst with no addition of alumoxane, said polymerization catalyst comprising
at least one transition metal compound selected from the group consisting of transition metal compounds represented by the following formula (1); and
an organoaluminum compound represented by the following formula (2):

Formula (1)

wherein each A is a substituted indenyl group, or one of A is a substituted indenyl group and the other is a group selected from groups which have a nitrogen atom or an oxygen atom coordinated or directly bonded to metal M and, if necessary, a $C_{1-20}$ hydrocarbon group; said groups may further contain from 1 to 3 boron, silicon, phosphorus, selenium, sulfur, chlorine or fluorine atoms, and in a case where each A is a substituted indenyl group, the two A may be the same or different;
wherein Y is a substituted silicon group or a substituted boron group, which has bonds to the two A and further has hydrogen or a $C_{1-20}$ hydrocarbon group as a substituent, the substituent in Y may contain from 1 to 5 nitrogen, boron, silicon, phosphorus, selenium, oxygen, sulfur, chlorine or fluorine atoms, or may have a cyclic structure;

X each independently is hydrogen, halogen, a $C_{1-15}$ alkyl group, a $C_{3-20}$ alkenyl group, a $C_{6-10}$ aryl group, a $C_{8-12}$ alkylaryl group, a silyl group having a $C_{1-4}$ hydrocarbon substituent, a $C_{1-10}$ alkoxy group, or an amido or amino group having hydrogen or a $C_{1-22}$ hydrocarbon substituent; n is 0, 1 or 2; and when a plurality of X are present, they may be bonded to one another, and
M is zirconium, hafnium or titanium;

$$Al(R)_3 \qquad \text{Formula (2)}$$

wherein R each independently is hydrogen or $C_{2-20}$ hydrocarbon, provided that among these R, one or two may be halogen; R may have a cyclic structure; when these R are hydrocarbon groups, they may contain from 1 to 5 nitrogen, silicon, phosphorus or halogen atoms; a plurality of R in the formula may have a bonding structure; and a plurality of such organoaluminum compounds may be bonded via R;
wherein the amount of a Lewis basic substance in a polymerization solution is at most 30 ppm;
wherein the polymerization activity is at least $1000 \times 10^6$ g/mol-M·h.

11. The process for producing an olefin polymer according to claim 10, wherein the substituted indenyl group is represented by the following formulae (3-1) or (3-2):

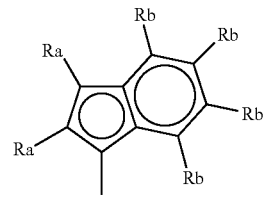

Formula (3-1)

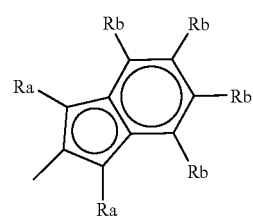

Formula (3-2)

wherein in the formulae (3-1) and (3-2), Ra each independently is hydrogen, halogen, a hydroxyl group, an amine group or a $C_{1-20}$ hydrocarbon group; the hydrocarbon group may contain from 1 to 3 halogen, silicon, phosphorus, oxygen, boron, nitrogen, sulfur or selenium atoms; and they may have a structure of an $OSiR_3$ group, a $SiR_3$ group, an $NR_2$ group, an OH group, an SR group, a SeR group, an OR group or a $PR_2$ group, wherein each R is a $C_{1-10}$ hydrocarbon group; and
Rb each independently is hydrogen, halogen, a hydroxyl group, an amine group or a $C_{1-20}$ hydrocarbon group; the hydrocarbon group may contain from 1 to 3 halogen, silicon, phosphorus, oxygen, boron, nitrogen, sulfur or selenium groups; they may have a structure of an $OSiR_3$ group, a $SiR_3$ group, an $NR_2$ group, an OH group, an SR group, a SeR group, an OR group or a $PR_2$ group, wherein each R is a $C_{1-10}$ hydrocarbon group; and further, adjacent substituents of such hydrocarbons may be united to form a single or plural 5- to 8-membered cyclic aromatic rings or aliphatic rings;
provided that at least one of Ra is not hydrogen, or at least one of Rb is not hydrogen.

12. The process for producing an olefin polymer according to claim 11, wherein the two A in the formula (1) are substituted indenyl groups represented by the formulae (3-1) or (3-2), and in this case, the two A may be the same or different.

13. The process for producing an olefin polymer according to claim 10, wherein at least one A or the two A in the formula (1) are any one of substituted benzoindenyl groups which may have substituents, represented by the formulae (4-1) to (4-3), and in this case, the two A may be the same or different:

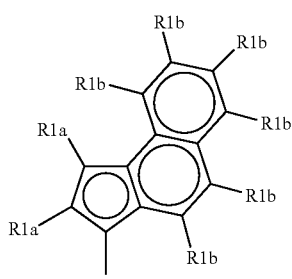

Formula (4-1)

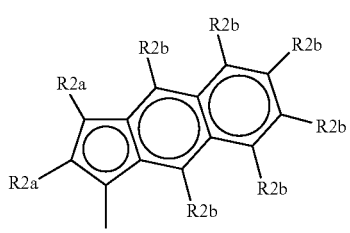

Formula (4-2)

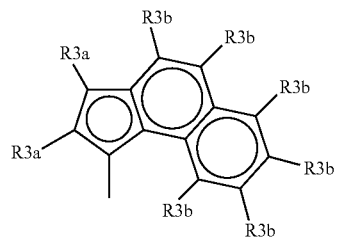

Formula (4-3)

wherein in the above formulae (4-1) to (4-3), R1a, R1b, R2a, R2b, R3a and R3b each independently is hydrogen, halogen, a hydroxyl group, an amine group or a $C_{1-20}$ hydrocarbon group; said hydrocarbon groups may contain from 1 to 3 halogen, silicon, phosphorus, oxygen, boron, nitrogen, sulfur or selenium atoms; they may have a structure of a $OSiR_3$ group, a $SiR_3$ group, an $NR_2$ group, an OH group, an OR group, an SR group, a SeR group or a $PR_2$ group (each R is a $C_{1-10}$ hydrocarbon group); each R1a independently, each R1b independently, each R2a independently, each R2b independently, each R3a independently and each R3b independently, may be the same or different; and further, adjacent substituents may be united to form a single or plural 5- to 8-membered cyclic aromatic rings or aliphatic rings.

14. The process for producing an olefin polymer according to claim 10, wherein the organoaluminum compound is triisobutyl aluminum.

15. The process for producing an olefin polymer according to claim 10, wherein the amount of aluminum in the organoaluminum compound is within a range of from 10 to 100,000 times by molar ratio based on the transition metal in the transition metal compound.

* * * * *